(12) United States Patent
Gunther

(10) Patent No.: US 6,719,522 B1
(45) Date of Patent: Apr. 13, 2004

(54) SHEET FEEDING

(76) Inventor: William H. Gunther, 47 Water St., P.O. Box 586, Mystic, CT (US) 06355

( * ) Notice: Subject to any disclaimer, the term of this patent is extended or adjusted under 35 U.S.C. 154(b) by 0 days.

(21) Appl. No.: 10/252,140

(22) Filed: Sep. 23, 2002

(51) Int. Cl.⁷ ................................................ B65H 29/00
(52) U.S. Cl. ................. 414/791.2; 414/791; 414/790.8; 270/52.09; 271/184; 271/225
(58) Field of Search ....................... 270/52.09; 271/9.13, 271/184, 225; 414/790.8, 791.2, 791

(56) References Cited

U.S. PATENT DOCUMENTS

| | | | |
|---|---|---|---|
| 3,693,486 A * | 9/1972 | Maniaci et al. ................. 83/88 |
| 4,171,127 A | 10/1979 | Kish et al. |
| 4,456,127 A | 6/1984 | Hams |
| 4,502,676 A | 3/1985 | Stocker |
| 4,674,375 A * | 6/1987 | Golicz ........................... 83/91 |
| 4,770,407 A * | 9/1988 | Nail ............................ 271/275 |
| 4,977,827 A * | 12/1990 | Chandhoke et al. ........... 100/7 |
| 5,025,609 A | 6/1991 | Moser et al. |
| 5,074,743 A * | 12/1991 | Schaffner et al. ........ 414/790.8 |
| 5,104,104 A | 4/1992 | Mol |
| 5,540,370 A | 7/1996 | Ring |
| 5,570,172 A * | 10/1996 | Acquaviva .................. 399/403 |
| 5,704,604 A | 1/1998 | Koelle et al. |
| 5,768,959 A | 6/1998 | Lorenzo |
| 5,790,168 A * | 8/1998 | Sano et al. .................. 347/262 |
| 6,109,603 A | 8/2000 | Stevens et al. |
| 6,192,295 B1 * | 2/2001 | Gunther ...................... 700/225 |
| 6,234,467 B1 | 5/2001 | Runzi |
| 6,244,584 B1 | 6/2001 | Holbrook et al. |
| 6,324,442 B2 | 11/2001 | Gunther |
| 6,341,773 B1 * | 1/2002 | Aprato et al. ............... 271/9.13 |
| 6,402,136 B1 * | 6/2002 | Lamothe ..................... 271/185 |
| 6,443,447 B1 | 9/2002 | Ifkovits et al. |
| 6,460,842 B1 * | 10/2002 | Koelle ...................... 270/58.01 |
| 6,467,763 B1 | 10/2002 | Depoi et al. |
| 6,485,010 B1 * | 11/2002 | Lamothe .................. 270/52.09 |
| 6,575,461 B1 * | 6/2003 | Rider ......................... 271/315 |

FOREIGN PATENT DOCUMENTS

EP  0 914 968 A2  12/1999

* cited by examiner

Primary Examiner—Patrick Mackey
(74) Attorney, Agent, or Firm—Joseph J. Previto

(57) ABSTRACT

A mechanism and method for accumulating sheet stacks from a continuous web having sheets printed both in side-by-side relationship and with the sheets behind each other. Slitting the continuous web lengthwise between said side-by-side sheet and cutting the web transversely between the sheets behind each other sheets to separate the printed sheets. Accumulating the printed sheets into separate stacks and stacking the separate stacks one on top of the other in offset relationship to each other and moving the offset stacks into a receptacle, such as a cassette.

19 Claims, 2 Drawing Sheets

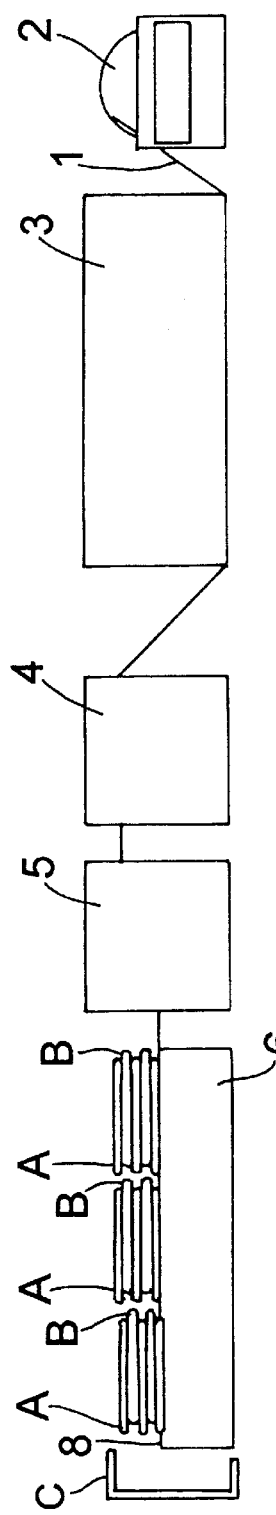
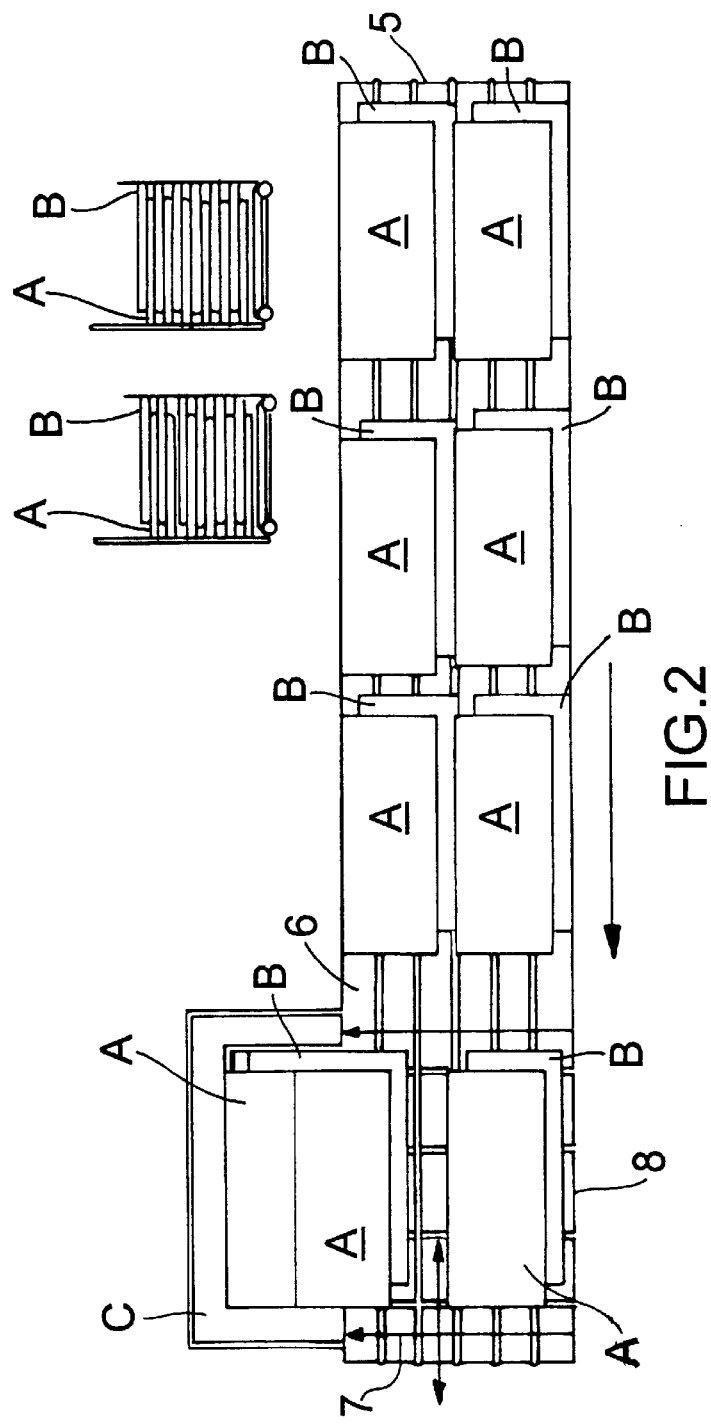

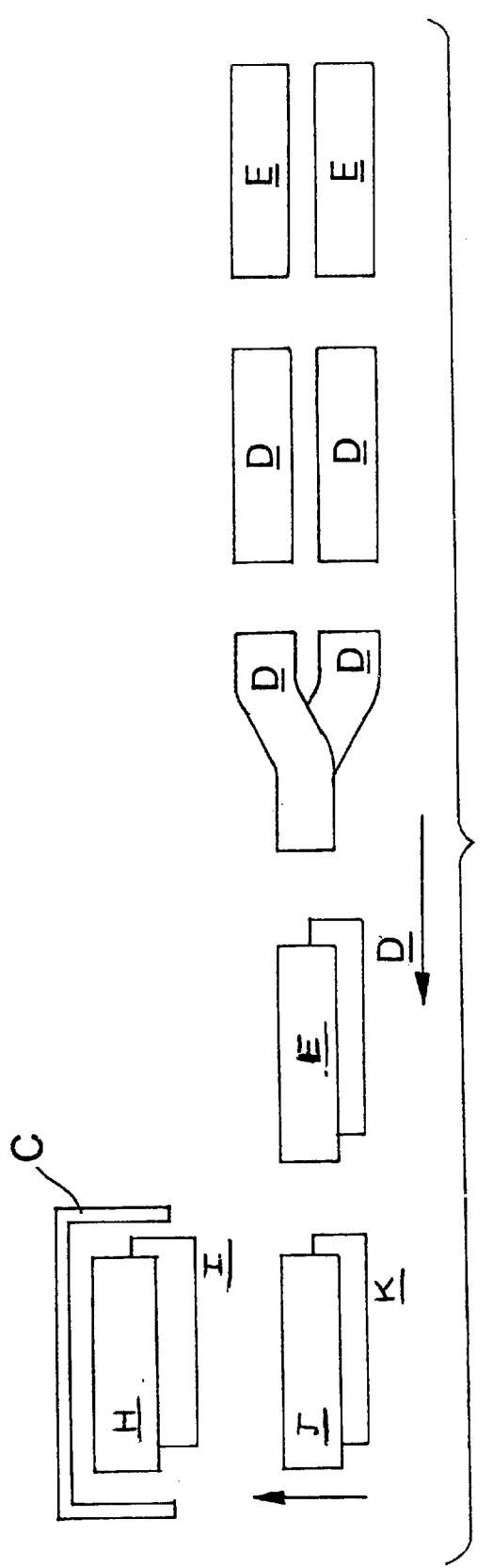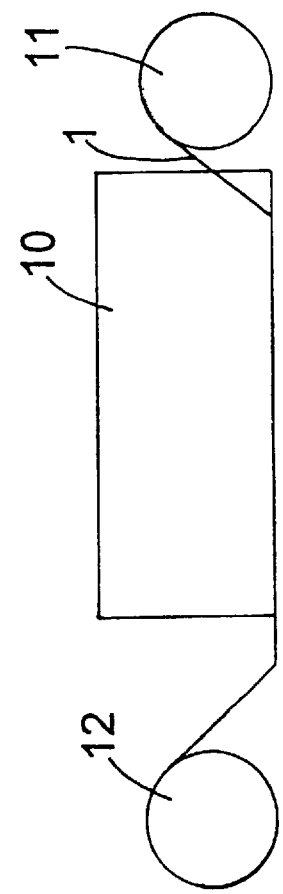

SHEET FEEDING

BACKGROUND

The present invention relates to an improved printed sheet feeding mechanism and method and more particularly to an improved printed sheet feeding mechanism and method for feeding and stacking printed sheets from a continuous web.

As set forth in U.S. Pat. No. 6,234,647 (incorporated herein by reference), single sheets are fed from a printer and accumulated in stacks. Each stack represents a complete project, such as a book or report. The complete stacks are deposited into a cassette in offset relationship to each other so that when the cassette is filled it has a number of offset stacks of printed sheets. The stacks in these cassettes can then be transferred to another machine (such as a finishing machine) in any well known manner, such as that described and shown in U.S. Pat. Nos. 6,192,295 and 6,324,442 (both of which are incorporated herein by reference).

The methods and mechanisms now in use for performing these operations are primarily concerned with feeding and stacking single printed sheets. However, sheets for a project are sometimes printed in side-by-side relationship on a continuous roll with projects of equal number of sheets being printed side-by-side with consecutive sheets on each side and projects of different number of sheets being printed on the continuous roll one project behind the other with consecutive sheets in side-by-side relationship. It may also be desirable to print from web1-to-web and then slit cut and stack the sheets as a separate off-line finishing operation. An example of this would be when a continuous web is fed from a printer with the first printed sheet being the bottom sheet of the web and when unwound would be the last sheet to be processed in any finishing operation. In printing such sheets in side-by-side relationship, if the number of sheets of each project are the same then the two projects can be printed in side-by-side relationship with consecutive sheets on the same side and when the sheets are separated from the web, separate stacks of the same number of sheets can be formed. If the projects are of different lengths requiring stacks of different number of sheets, then the sheets of one project are printed in side-by-side relationship on the web with consecutive sheets in side-by-side relationship and a second project is printed in a side-by-side relationship on the continuous web behind the first project with consecutive sheets in side-by-side relationship. In this instance, the sheets must be separated and merged from a side-by-side relationship to a single file relationship and stacked as separate stacks. Alternately, where the projects are of unequal length, each project can be printed on each side of a web and slit cut and assembled into stacks with blank sheets left over from the side with the shorter project. Existing equipment and methods do not provide for separating the side-by-side sheets from a continuous web, placing the separated sheets into stacks which are offset from each other and placing them into another mechanism such as a cassette.

OBJECTS

The present invention provides an improved sheet feeding and stacking mechanism and method for sheets printed on a continuous web in side-by-side relationship.

Another object of the present invention is the provision of an improved sheet feeding and stacking mechanism and method in which the side-by-side printed sheets on a continuous web are separated into separate sheets which are then accumulated in stacks offset from each other and placed into another mechanism, such as a cassette.

Other and further objects of the invention will be obvious upon an understanding of the illustrative embodiment about to be described, or will be indicated in the appended claims and various advantages not referred to herein will occur to one skilled in the art upon employment of the invention in practice

DRAWINGS

A preferred embodiment of the invention has been chosen for purposes of illustration and description and is shown in the accompanying drawings forming a part of the specification, wherein:

FIG. 1 is a schematic side view showing the general operation of this invention.

FIG. 2 is a schematic top view showing one embodiment of the present invention.

FIG. 3 is a schematic top view showing another embodiment of the present invention.

FIG. 4 is a schematic top view showing another embodiment of the present invention.

FIG. 5 is a schematic side view showing one manner of printing and storing a printed continuous roll.

DESCRIPTION

Referring to the drawings, and more particularly to FIG. 1 which illustrates schematically the operation of this invention, a continuous web 1 of paper having side-by-side sheets is fed from a continuous web source 2 to a continuous roll printer assembly 3 which prints sheets on the continuous web 1 in side-by-side relationship. As indicted above, if the length of each project being printed has the same number of sheets, then each project can be printed on the web 1 in side-by-side relationship with the consecutive pages of the project on the same side numbered in declining or ascending order. Even if the projects are of different lengths, they can be printed and stacked in the same manner with sheets left over from the short project. If the projects have different number of sheets then an entire project can be printed in side-by-side relationship with consecutive pages of each project printed next to each other until the particular project is finished. After which a subsequent project is printed in the same manner immediately behind the completed previous project with consecutive sheets in side-by-side relationship. When the sheets of each project have been printed, the individual printed sheets are separated (slit lengthwise and cut transversely) from the continuous web 1 by a cutter assembly 4 and accumulated into stacks A and B by a stacker 5 in offset relationship to each other. Well known detecting mechanisms may be used to detect the first and last pages of a project so that the mechanism is alerted as to when to start a stack and when to finish a stack. In the stacks 5 several stacks A and B may be placed one on top of the other to form a group of offset stacks A and B. A main conveyor assembly 6 moves the offset group of stacks A and B toward a conveyor exit 8. When the groups of offset stacks A and B reach the conveyor exit 8, the offset stacks A and B are then fed as a group into a cassette C by the main conveyor assembly 6. The stacks A and B retain their offset relationship when they are deposited as a group into the cassette C. The cassette C is lowered to receive the next group of stacks A and B and when the cassette C is full it can then be moved to another station (not shown) for further processing of the offset stacks A and B. If the documents are of a size that would allow for East—West or left—right orientation, then the cassette C may be placed next to the conveyor exit 8 of the main assembly conveyor 6 and the groups of stacks A and B would enter and be delivered directly into the cassette C by the main conveyor C in the direction of the movement of the main assembly conveyor 6. If the documents are of a size to allow North-South or front-back orientation, then the cassette C may be located at right angles to conveyor exit 8 of the main conveyor assembly 6 and a cross conveyor 7 (FIG. 2) may be provided to move the groups of stacks A and B at right angles to the main conveyor assembly 6 into a cassette C which may be placed at the end of a cross conveyor assembly 7.

FIG. 2 shows the embodiment of this invention when projects of equal length and stacks of equal thickness are printed in side-by-side relationship on the continuous web 1. When the continuous web 1 is cut transversely and slit lengthwise, the printed sheets on both sides of the continuous web 1 are accumulated in separate stacks A and B which are placed one on top of the other in offset relationship. This may be performed by any existing or well known machinery, such as by the mechanism and method shown and described in the aforementioned U.S. Pat. Nos. 6,234,647, 6,192,295 and 6,324,442. The plurality of groups of offset stacks A and B are then moved by the main conveyor assembly 6 until the groups of offset stacks A and B are adjacent the cassette C which may be inserted at a right angle into the cassette C as shown in FIG. 2 groups of stacks A or B are moved by a cross conveyor assembly 7 at right angles to the main conveyor assembly 6 into the cassette C or which may be inserted directly into the cassette C, as shown in FIG. 1 (the group of stacks A and B are moved directly into the cassette C as a group by the main conveyor assembly 6.) The cassette C is lowered as each group of offset stacks A and B is placed therein to make room for the next group of stacks. The stacks A and B retain their offset relationship while in the cassette C. When the cassette C is filled it is moved to another station (not shown) for further operations to be performed on the stacks A and B and a new cassette C is placed at the conveyor exit 8.

FIG. 3 shows a common method of performing the invention when the projects are of different lengths so that the resulting stacks D and E will be of different thicknesses. In this event, the sheets D of a project are printed in side-by-side relationship on the continuous web 1 with consecutive pages next to each other in side-by-side relationship until that project is completed. The next project is also printed on side-by-side sheets E (with consecutive pages next to each other in side-by-side relationship) on the continuous web 1 after the sheets D of the previous project have been completed. The continuous web 1 is slit lengthwise and cut transversely so that the sheets D of a project are merged and assembled one on top of the other into a stack D containing the completed project. Upon the completion of that stack D, the next project of sheets E is also slit, cut, merged and accumulated in a stack E which is placed on top of the first stack D in offset relationship to the first stack D. The stacks D and E are accumulated as groups of stacks and are then moved by the main conveyor assembly 6 (as illustrated by previously assembled stacks J and K at left side of FIG. 3) to the conveyor exit 8 and are deposited as a group into a cassette C (as illustrated by previously deposited stacks H and I at the left side of FIG. 3).

Referring to FIG. 4, it sometimes occurs that when printing projects of different lengths, the last page of one project is printed next to the first page of the second project. When the continuous web 1 is slit lengthwise and cut transversely the two separate side-by-side sheets of each project (which have been cut individually) are merged and moved by separate conveyors (not shown) overlying each other, so that one project F is moved by the top conveyor (for example) and the second project G is moved by the bottom conveyor. These two are then merged separately into separate stacks F and G and are placed one on top of the other in offset relationship to each other. They accumulate as groups of stacks F and G.

Referring to FIG. 5, the sheets are sometimes printed by a printer 10 in a continuous web 1 from a first web 11 and then re-rolled into a second roll 12 (or if fan fold webs are used, the printed sheets can be folded and stored). The printed second roll 12 can then be cut and accumulated into separate stacks by the methods and mechanisms hereinbefore described with respect to FIGS. 1 to 4.

It will thus be seen that the present invention provides an improved means for sheet feeding and stacking mechanism of sheets printed on a continuous roll in side-by-side relationship and in which the side-by-side printed sheets on a continuous roll are separated into separate-sheets which are accumulated in stacks offset from each other.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A mechanism for accumulating stacks of sheets from a continuous web having sheets printed both in side-by-side relationship and with one behind the other, comprising means for slitting said continuous web lengthwise between said side-by-side sheets and for cutting said web transversely between said sheets to separate said printed sheets, means for accumulating said printed sheets into separate stacks, means for stacking said separate stacks one on top of the other in offset relationship to each other to form a group of offset stacks, and means for moving said group of offset stacks into stack-receiving means.

2. A mechanism as set forth in claim 1, wherein means are provided to deposit said stacks in said stack-receiving means while maintaining their offset relationship.

3. A mechanism as set forth in claim 2, wherein detecting means are provided for alerting the mechanism when to complete one stack and when to begin another stack.

4. A mechanism as set forth in claim 3, wherein means are provided to accumulate said stacks into groups of offset stacks.

5. A mechanism as set forth in claim 4, wherein said separate projects and said stacks in said projects have a different number of printed sheets and are printed on each side of said side-by-side relationship with consecutive sheets on the same side of the side-by-side relationship.

6. A mechanism as set forth in claim 4, wherein said separate projects and said stacks in said projects have the same number of printed sheets and are printed on each side of said side-by-side relationship with consecutive sheets on the same side-by-side relationship.

7. A mechanism as set forth in claim 4, wherein said projects and stacks have a different number of sheets with consecutive sheets of each project printed on sheets on each side of said side-by-side relationship.

8. A mechanism as set forth in claim 7, wherein means are provided to merge the side-by-side sheets of each project together into a single stack.

9. A mechanism as set forth in claim 8, wherein means are provided to merge each separated project together and separate means are provided to convey said merged sheets of each project to said stack receiving means in an offset relationship to each other.

10. A mechanism as set forth in claim 9, wherein said separate means comprise separate conveyors.

11. A method of accumulating stacks of sheets from a continuous web having sheets printed both in side-by-side relationship and one behind the other, comprising slitting said continuous roll lengthwise between said side-by-side sheet and cutting said web transversely between said sheets to separate said printed sheets, accumulating said printed sheets into separate stacks stacking said separate stacks one on top of the other in offset relationship to each other to form a group of offset stacks and moving said group of offset stacks into stack-receiving means.

12. A method as set forth in claim 11, wherein said stacks are deposited in stack receiving means while maintaining their offset relationship.

13. A method as set forth in claim 12, wherein detecting when to complete one stack and when to begin another stack.

14. A method as set forth in claim 13, wherein said stacks are accumulated into groups of offset stacks.

15. A method as set forth in claim 4, wherein said separate projects and said stacks in said projects have a different number of printed sheets and are printed on each side of said side-by-side relationship with consecutive sheets on the same side of said side-by-side relationship.

16. A method as set forth in claim 14, wherein said separate projects and said stacks in said projects have the same number of printed sheets and are printed on sheets on each side of said side-by-side relationship which consecutive sheets on the same side of said side-by-side relationship.

17. A method as set forth in claim 14, wherein said projects and stacks have a different number of sheets with consecutive sheets of each project are printed on sheets on each side of said side-by-side relationship.

18. A method as set forth in claim 17, wherein the side-by-side sheets of each project are merged together into a single stack.

19. A mechanism as set forth in claim 18, wherein each separated project is merged together and said merged sheets of each project are conveyed separately in an offset relationship to each other.

* * * * *